United States Patent [19]

Short

[11] Patent Number: 5,121,377
[45] Date of Patent: Jun. 9, 1992

[54] ERROR DETECTION METHOD AND APPARATUS FOR REDUCING THE NUMBER OF ERRORS GENERATED WHEN READING DIGITAL DATA STORED ON A RECORDING MEDIUM SUCH AS FILM

[75] Inventor: William R. Short, Ashland, Mass.

[73] Assignee: Bose Corporation, Framingham, Mass.

[21] Appl. No.: 183,582

[22] Filed: Apr. 19, 1988

[51] Int. Cl.$^5$ .............................................. G11B 7/00
[52] U.S. Cl. .................................. 369/107; 369/120; 369/121
[58] Field of Search ................... 352/27, 28; 369/100, 369/107, 120, 121; 250/578; 371/48

[56] References Cited

U.S. PATENT DOCUMENTS

| | | | |
|---|---|---|---|
| 3,407,272 | 10/1968 | Barocela | 369/108 |
| 3,513,268 | 5/1970 | John | 369/108 |
| 4,235,531 | 11/1980 | McCormick | 369/107 |
| 4,238,760 | 12/1980 | Carr | 357/55 |
| 4,600,280 | 7/1986 | Clark | 352/37 |

*Primary Examiner*—Dale M. Shaw
*Assistant Examiner*—David Huntley
*Attorney, Agent, or Firm*—Fish & Richardson

[57] ABSTRACT

A method and apparatus for reducing the number of errors generated when reading digital data stored on a recording medium such as film, the method comprising passing light of two different frequencies (i.e., two different frequency bands) through the film, one frequency being modulated by digital data stored on the film and the other being unaffected by the stored data. The light that is unaffected by the stored data is modulated by debris on the film such as dirt and is used to flag data bits that may be in error to thereby facilitate an error correction process. In the first disclosed embodiment the two frequencies of light are processed separately to obtain the digital data and error flags. A second embodiment combines all light passing through the film to produce digital information that includes error flags.

8 Claims, 3 Drawing Sheets

ERROR DETECTION METHOD AND APPARATUS FOR REDUCING THE NUMBER OF ERRORS GENERATED WHEN READING DIGITAL DATA STORED ON A RECORDING MEDIUM SUCH AS FILM

BACKGROUND OF THE INVENTION

This invention relates to the reading of stored digital information such as digitally encoded audio information and, more specifically, to a method and apparatus for detecting and reducing the number of errors introduced by reading recorded digital data.

In the process of digitally recording sound in an optical format on a recording medium such as motion picture film, audio signals are digitized and encoded into ones and zeros. These digital bits are recorded on the film, typically as clear and opaque regions, on the portion of the film reserved for audio data (i.e., the sound track area). Such a system is disclosed in U.S. Pat. No. 4,600,280 to Clark, incorporated herein by reference.

When the digital bit stream is read off of the film by a projector, errors are frequently made in determining whether an area representing a bit is clear or opaque. These errors may be due to scratches on the film, debris on the film, or a variety of other reasons. The frequency of occurence of such errors can be quite high, especially as the film wears. While new film typically has one error for each 10,000 bits read, film nearing the end of its useful life can have one error for each 100 bits read. By comparison, a typical digital compact disc has an error rate of only one in 100,000 bits read or better.

In order to detect errors and reduce the error rate, several error correction techniques have been developed. For such techniques to be effective, the exact location of an error must be determined.

For example, one prior art method for determining the occurence of an error, as well as its exact location, involved arranging the data bits into blocks. An example of such a block, containing seven rows and five columns, is shown below.

| 0 | 0 | 1 | 1 | 0 |
|---|---|---|---|---|
| 1 | 1 | 1 | 1 | 0 |
| 1 | 0 | 0 | 1 | 1 |
| 1 | 0 | 1 | 0 | 1 |
| 1 | 0 | 0 | 1 | 0 |
| 0 | 1 | 0 | 0 | 1 |
| 1 | 0 | 0 | 0 | 0 |

The error detection technique involves adding a sixth bit to each row, the bit being equal to the modulo 2 sum of the five bits in the row. Similarly, for each column, an eighth bit is appended to the bottom, which is also set equal to the modulo 2 sum of the seven bits in the column. Finally, an additional bit is appended to the lower right corner, this bit being equal to the modulo 2 sum of either the row of five error correction bits, or the column of seven error correction bits. (The sums of the column of error correction bits and the row of error correction bits are always identical). The block of data with the error correction bits appended is shown below.

| 0 | 0 | 1 | 1 | 0 | 0 |
|---|---|---|---|---|---|
| 1 | 1 | 1 | 1 | 0 | 0 |
| 1 | 0 | 0 | 1 | 1 | 0 |
| 1 | 0 | 1 | 0 | 1 | 1 |
| 1 | 0 | 0 | 1 | 0 | 0 |
| 0 | 1 | 0 | 0 | 1 | 0 |
| 1 | 0 | 0 | 0 | 0 | 1 |
| 1 | 0 | 1 | 0 | 1 | 1 |

These thirteen error correction bits are recorded along with the data bits, and, after being read from the recording medium, are reassembled into the original block. The modulo 2 sums of each row and column are then calculated and are compared to the error correction bits read from the recording medium. If the read and calculated error correction bits match, then the data is assumed to be error free.

However, if there is an error, the error can be detected and corrected. The block of read data is shown below where an asterisk indicates a correctly read bit, and an X indicates an error.

| • | • | • | • | • | • |
|---|---|---|---|---|---|
| • | • | X | • | • | • |
| • | • | • | • | • | • |
| • | • | • | • | • | • |
| • | • | • | • | • | • |
| • | • | • | • | • | • |
| • | • | • | • | • | • |
| • | • | • | • | • | • |

When the modulo 2 sums are calculated for the second row and the third column, the result will differ from the read error correction bits, as shown by the —.

| • | • | • | • | • | • |
|---|---|---|---|---|---|
| • | • | X | • | • | — |
| • | • | • | • | • | • |
| • | • | • | • | • | • |
| • | • | • | • | • | • |
| • | • | • | • | • | • |
| • | • | • | • | • | • |
| • | • | — | • | • | • |

With this information, it can be determined not only that an error exists, but the exact bit that is in error can be calculated. In other words, the bit located at the intersection of the row and column having differing read and calculated error correction bits can be inverted, thereby correcting the error.

SUMMARY OF THE INVENTION

The invention features a method and apparatus for detecting and reducing the number of errrors introduced when reading digital data stored on a recording medium such as film, the method comprising the steps of: passing light of a first frequency (or first band of frequencies) through the recording medium, the light being moudulated in accordance with digital data stored on the recording medium; passing light of a second frequency (or second band of frequencies) through the recording medium, the second frequency light being substantially unaffected by the stored digital data; generating a first signal representing the modulated first frequency light; generating a second signal representing the second frequency light; generating digital data in accordance with the first signal; and correcting errors in the generated digital data in accordance with information derived from the second signal.

In a second embodiment of the invention, the method comprises the steps of: passing light of a first frequency through the recording medium, the light being modulated in accordance with digital data stored on the recording medium; passing light of a second frequency through the recording medium, the second frequency light being substantially unaffected by the stored digital data; generating a signal representing said first frequency light and said second frequency light; and generating digital information from said signal including error information indicating possible errors in said digital information.

DETAILED DECRIPTION OF THE PREFERRED EMBODIMENTS

The drawings will first be briefly described.

DRAWINGS

STRUCTURE

Figure 1:
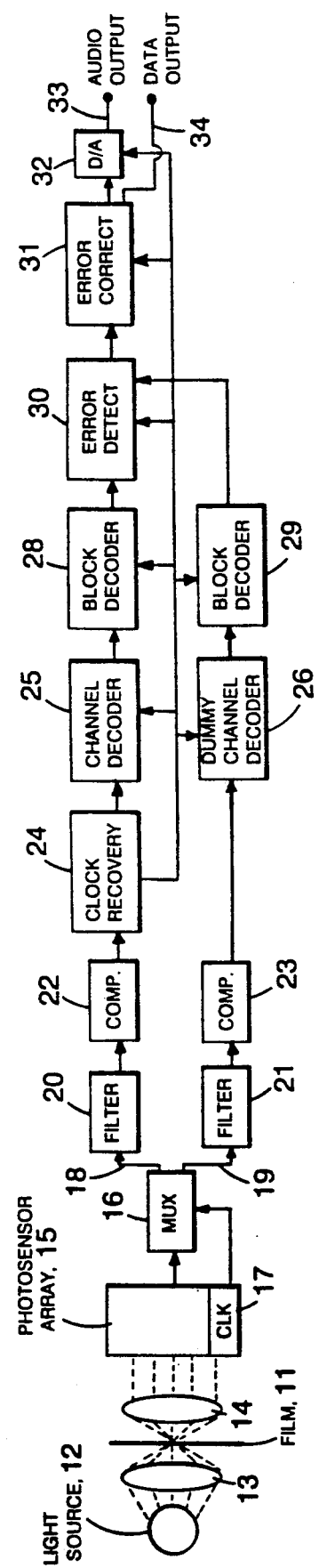
FIG. 1 is an overall block diagram of a first embodiment of the invention.

The system implementing the preferred embodiment of the invention is illustrated in FIG. 1 and comprises film 11 used to record the digital data, and which is illuminated by light source 12, the light being focused into film 11 by means of lens 13. Lens 14 focuses light that has passed through film 11 onto photosensor array 15. The output of photosensor array 15 is input to a multiplexer 16, which is driven by the photosensor array clock 17. Multiplexer 16 has outputs 18 and 19 corresponding to light of two different frequencies, as discussed below. Outputs 18 and 19 feed filters 20 and 21, respectively. The apparatus further comprises comparators 22 and 23, clock recovery circuit 24, channel decoder 25, dummy channel decoder 26, and block decoders 28 and 29. An error detection circuit 30 receives outputs from the two block decoders, and supplies a signal to error correction and concealment circuit 31. D/A convertor 32 produces audio output 33. The system also includes data output 34.

Figure 2:
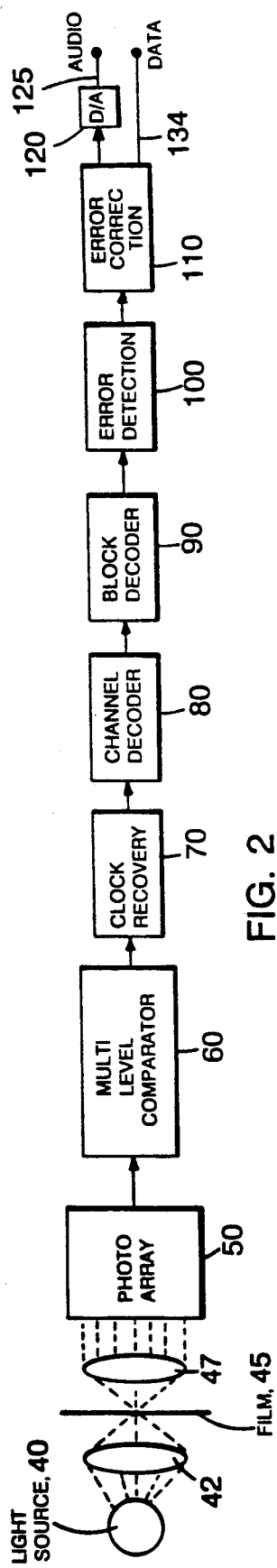
FIG. 2 is a block diagram of a second embodiment of the invention.

FIG. 2 illustrates a block diagram of the second embodiment of the invention. It comprises light source 40 which produces light focused on film 45 by means of lens 42. Lens 47 focuses light onto wide band photosensor device 50 which transmits its output to a multilevel comparator 60. The output of comparator 60 is input to clock recovery circuit 70, which has outputs to each of channel decoder 80, block decoder 90, error detection circuit 100, error correction and concealment circuit 110 and D/A converter 120, which produces audio output 125. The system includes data output 134.

OPERATION

The preferred embodiment of the invention illustrated in FIG. 1 combines standard error correction techniques, such as the technique described above (i.e., block formation with error correction bits), with a second novel method for determining which data bits in the read data may be in error. The invention takes advantage of the fact that there are certain frequencies of light which will not be modulated by the recorded digital data. In other words, light of these frequencies pass through film without being affected in any way by the digital data on the film. For example, in most recording systems, color print film is nearly transparent at infrared wavelengths. Therefore, any modulation that occurs to an infrared beam of light passing through the film would be due to dust, dirt, etc. Since digital data stored on a portion of the film that has been contaminated by dirt or dust is probably incorrect data, information regarding the location of such portions of the film can be advantageously used in the error correction process as described more fully below.

Figure 1A:
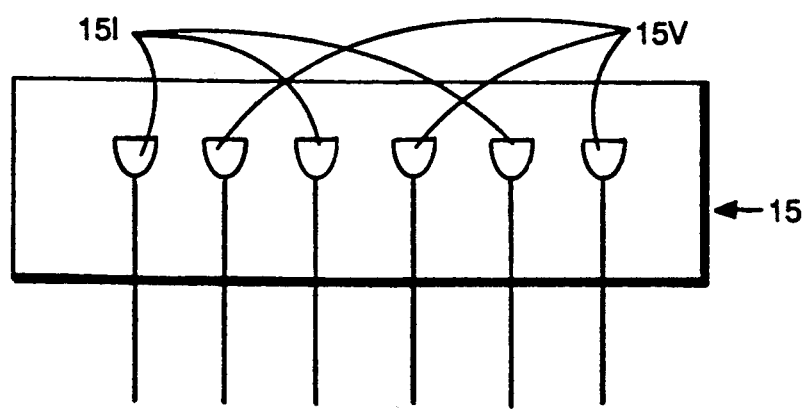
FIG. 1A is a pictorial representation of a photocell array having photocells responsive to visible and infrared light respectively.

Referring to FIG. 1, light source 12 produces light containing a broad range of frequencies which includes at least one frequency (or band of frequencies) that will be modulated by the information stored on film 11, and a second frequency (or band of frequencies) that will be unmodulated by the digital data (e.g., infrared light), but will of course be modulated by dirt or other debris on the film. Photosensor array 15 contains both photosensors 15V sensitive only to the visible light and photosensors 15I sensitive only to the infrared light as pictorially represented in FIG. 1A. In the preferred embodiment a line array of photosensors is used, with e.g., every even numbered photosensor in the line array being sensitive to visible light and every odd numbered photosensor being sensitive to infrared light. Each data bit will be focused onto several photosensors in the line array (i.e., the width of each photosensor is much less than the width of the stored bit). In this manner as the film weaves laterally through the projector causing the image of the data bits to move slightly from side to side along the surface of the photosensors, a data bit will never be "lost" by falling in between to adjacent photosensors in the array.

Accordingly, the image of each data bit will fall on several visible light photosensors and several infrared light photosensors giving a good representation of both the visible and infrared signal for each data bit on the film.

The multiplexor 16 feeds the signal from the visible light photosensors to output 18, and the signal from the infrared light photosensors to output 19. Filters 20 and 21 eliminate switching transients, reduce noise, and compensate for losses in the optics and film. Such filters are well known to those with ordinary skill in the art.

Comparators 22 and 23 compare the outputs of filters 20 and 21, respectively, to a predetermined threshold. If the input level at each comparator is above the threshold level (indicating that the light level at the corresponding photosensor array is above the predetermined threshold), the output of the comparator is "high." IF the input level is not above the predetermined threshold then the output is held "low. " For the visible wavelength signal (i.e., the signal compared in comparator 22) these levels correspond to ones and zeros in the audio data stream, since this signal has been modulated by the stored digital data on film 11. For the infrared wavelength signal, low levels correspond to areas on the film that have been obscured (e.g., by dirt), and thus possible regions of errors (hereinafter "error flags").

The visible band signal feeds a standard clock regeneration circuit 24, which extracts a data clock signal from the data. The clock signal drives the rest of the circuitry as shown to ensure that data is passed from one stage to the next in synchronism.

Typical film recorders do not record the ones and zeros of audio data directly, but encode the data in a variety of ways to increase the quality of the recording. Typically, several bits recorded on the film are used to represent a single data bit of the original audio data. Accordingly, channel decoder 25 is used to decode the ones and zeros read from the film and generate the original audio digital data. It is therefore necessary to use a dummy channel decoder 26, which functions to ensure that the correspondance between the error flags and the audio data is maintained. In other words, since the error flags indicate portions on the film that have been obscured by debris and therefore probably contain faulty audio data, it is necessary that any processing performed on the audio data also be performed on the error flags so that the error flags will continue to indicate audio data that may be in error.

In order to further improve upon the integrity of the data, typical systems place the audio data in a block and scramble the block, so that a defect in data stored on the channel which obscures a large number of adjacent data bits. The scrambling process causes the errors to be scattered over a large amount of data. Therefore, the data from the channel decoder 25 is sent to block decoder 28 so that the data can be unscrambled in a manner complementary to any scrambling that took place in the decoder (i.e., before recording). Similarly, the error flags must be unscrambled in decoder 29 so that the the error flags maintain correspondence with the appropriate audio data bits.

The output of the error flag block decoder 29 now shows the position of the data bits thought to be in error. This information can be used by itself or can be combined with more conventional error detection means in error detection circuit 30 and error correction circuit 31 in order to find the location of all of the data bits thought to be in error and correct those errors.

As an example of the error correction capabilities of this invention, consider the following block of data, similar to the block described above, where X's indicate errors and asterisks indicate correct data bits. Dashes are again used to indicate a mismatch of row and column error correction bits, as described above.

| • | • | • | • | • | • |   |
|---|---|---|---|---|---|---|
| • | • | X | • | • | — |   |
| • | • | • | • | • | • |   |
| X | • | • | • | • | — |   |
| • | • | • | • | • | • |   |
| • | • | • | • | • | • |   |
| — | • | — | • | • | • |   |

This situation is ambiguous since a completely different error pattern could produce the same mismatch of row and column error correction bits, as shown below.

| • | • | • | • | • | • |
|---|---|---|---|---|---|
| X | • | • | • | • | — |
| • | • | X | • | • | — |
| • | • | • | • | • | • |
| • | • | • | • | • | • |
| • | • | • | • | • | • |
| — | • | — | • | • | • |

While the prior art system by itself is capable of correcting a single error as described above, it is apparent that such an error correction technique is incapable of correcting two errors (or more than two errors) since a given pattern of row and column error correcting mismatches does not uniquely specify a set of bits in error. The present invention would be able to quickly identify the location of the errors since the use of infrared light has identified portions on the film that have been obscured by dirt, etc., and flagged particular data bits as being possible errors. Ambiguous situations such as the one described above can therefore be easily corrected. In fact, even if only one of the two errors noted above have been flagged by the infrared technique of this invention, the ambiguity can be resolved. Similarly, the method of the invention can be combined with other error correction techniques.

The second embodiment of the invention is disclosed in FIG. 2 and utilizes a single photosensor array 50 that is sensitive to a wide range of light frequencies. Photosensor array 50 does not have photosensor elements that respond to different frequencies, as does photosensor array 15 described above. Light source 40 produces light of at least two frequencies, one of which is modulated by digital information stored on the film 45, and the other of which is modulated only by debris on the film. Photosensor array 50 is sensitive to both of these frequencies and its output is proportional to the total amount of light falling across its surface.

Figure 3:
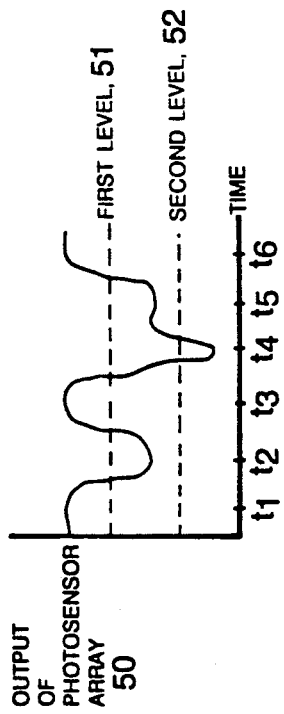
FIG. 3 is a diagram of the output of a photosensor used with the second embodiment of the invention.

The output of photosensor array 50 feeds a multi-level comparator 60 which produces digital information as described below. A sample output of photosensor array 50 is shown in FIG. 3. When the output of photosensor array 50 is above a first predetermined level (indicated at 51 in FIG. 3) comparator 60 outputs a "1". When the output of photosensor array 50 is between level 51 and a second predetermined level 52, comparator 60 outputs a "0". Finally, if the output of photosensor array 50 is below second predetermined level 52, comparator 60 outputs an error flag.

Since the electrical output of photosensor array 50 is proportional to the total amount of light falling over its surface, when a data "1" is recorded on the film (i.e., corresponding to a clear region on the film), and the film is not obscured by dirt etc., all of the light incident on the film passes through the film without being modulated, and photosensor array 50 will have its highest possible output. When a data "0" is recorded (i.e., an opaque region), some wavelengths are modulated (i.e., those corresponding to visible light) while infrared wavelengths are passed unaffected if the film is not obscured, causing a lower output level from the photosensor (between level 50 and level 51). When debris obscures the film, both visible and infrared wavelengths are modulated, resulting in a still lower output from photosensor array 50 (below level 51), and thus an error condition is indicated. As an example, if the photosensor output of FIG. 3 is sampled at times $t_1$-$t_6$, the output of comparator 60 would be "101X01", where X indicates an error flag.

The output of comparator 60 therefore comprises a digital data bit stream wherein errors are flagged. The system provides similar clock recovery, channel decoder, and block decoder functions as the data signal in the first embodiment. Note, however that since the infrared and visible light information is being simultaneously processed, there is no need for the parallel processing of the first embodiment (i.e., dummy channel decoder 26, block decoder 29 etc.). Standard error correction techniques can then be employed to correct and conceal the incorrect data bits.

There are several variations of the above described embodiments of the invention. For example, it may be desirable to use two separate light sources to provide light of two separate frequencies. Additionally, two separate photosensor devices might be utilized, coupled through a beam splitter and filters to the same optical system. It may also be desirable to use one photosensor with the first described embodiment instead of separate photosensors that are sensitive to the two different light frequencies utilized. In order to obtain the two separate signals needed (e.g., the infrared signal and the visible light signal), light of the two desired frequencies could be transmitted at different times, in a strobed fashion.

Rather than using an electrically scanned photosensor array, a single photosensor could be used with either a mechanical optical scanner or electrical optical scanner to scan the film in the transverse direction.

The use of an infrared beam to determine obscured areas of the film is merely illustrative. For example, since color motion picture print film has three color layers, data could be stored on two of the layers and the third used to generate the error flags. The error flags may be generated by any frequency of light that is unaffected by information stored on the film.

Other embodiments of the invention are within the scope of the appended claims.

We claim:

1. A method for reducing the number of errors generated when reading digital data stored on a recording medium such as film, comprising the steps of:
    passing light of a first frequency band through said recording medium, said first frequency light being modulated in accordance with said stored digital data;
    passing light of a second frequency band through said recording medium, said second frequency light being substantially unaffected by said stored digital data;
    generating a first signal representing said modulated first frequency light;
    generating a second signal representing said second frequency light;
    generating digital data in accordance with said first signal; and
    correcting errors in said generated digital data in accordance with said second signal,
    wherein said steps of generating said first signal and generating said second signal comprise receiving said first frequency light and said second frequency light on a photosensor device,
    wherein said first frequency light is generated by a first light source and said second frequency light is generated by a second light source,
    wherein said photosensor device comprises at least one photosensor, said photosensor being sensitive to light of said first frequency and to light of said second frequency, and wherein said first frequency light and said second frequency light are alternately passed through said recording medium.

2. A method for reducing the number of errors generated when reading digital data stored on a recording medium such as film, comprising the steps of;
    passing light of a first frequency band through said recording medium, said first frequency light being modulated in accordance with said stored digital data;
    passing light of a second frequency band through said recording medium, said second frequency light being substantially unaffected by said stored digital data;
    generating a signal representative of said first frequency light and said second frequency light;
    generating digital information from said signal, said digital information including error flags indicating possible errors in said digital information,
    wherein said step of generating digital information comprises;
    outputting a first digital value if said signal is above a first threshold;
    outputting a second digital value if said signal is below said first threshold and above a second threshold; and
    outputting an error flag if said signal is below said second threshold.

3. The method of claim 2 wherein said signal represents the sum of said first frequency light and said second frequency light.

4. The method of claim 2 wherein said error flag indicates a portion of said recording medium that has been unitentionally obscured by debris such as dirt.

5. An apparatus for reducing the number of errors generated when reading digital data stored on a recording medium such as film, said apparatus comprising;
    a light source for generating light of a first frequency band which passes through said recording medium and which is modulated by said stored digital data, and light of a second frequency band which passes through said recording medium and which is substantially unaffected by said stored digital data;
    a photosensor device for receiving said first frequency light and said second frequency light, and for generating a first signal representative of said first frequency light and a second signal representative of said second frequency light;
    a digital data generating device for generating digital data in accordance with said first signal; and
    an error correction device for correcting errors in said digital data in accordance with said second signal,
    wherein said light source comprises a first frequency light generator and a second frequency light generator,
    wherein said first frequency light generator and said second frequency light generator alternately generate said first frequency light and said second frequency light, respectively.

6. An apparatus for reducing the number of errors generated when reading digital data stored on a recording medium, said apparatus comprising;
    a light source for generating light of a first frequency band which passes through said recording medium and which is modulated by said stored digital data, and light of a second frequency band which passes through said recording medium and which is substantially unaffected by said stored digital data;
    a photosensor device for receiving said first frequency light and said second frequency light and generating a signal in response to said received light;
    a digital information generating device for generating digital information in response to said signal, said digital information including error flags indicating errors in said digital information, wherein said digital information generating device generates a first digital value if said signal is above a first threshold, generates a second digital value if said signal is below said first threshold and above a second threshold, and generates an error flag if said signal is below said second threshold.

7. The apparatus of claim 6 wherein said signal represents the sum of said first frequency light and said second frequency light.

8. The apparatus of claim 6 wherein said error flag indicates a portion of said recording medium that has been unintentionally obscured by debris such as dirt.

* * * * *